3,346,549
METHOD OF PREPARING AN OIL SOLUBLE SULFUR AND HALOGEN CONTAINING OLEFIN POLYMER AND PRODUCT
John Frederick Ford and Eric Simon Forbes, Sunbury-on-Thames, Middlesex, England, assignors to The British Petroleum Company Limited, London, England, a corporation of London
No Drawing. Filed June 3, 1964, Ser. No. 372,365
Claims priority, application Great Britain, June 14, 1963, 23,782/63
7 Claims. (Cl. 260—139)

This invention relates to the preparation of sulphur- and halogen-containing olefin polymers suitable for use as additives for improving the viscosity index and load carrying properties of lubricating oils, and to lubricating compositions containing such polymers.

According to the invention, an oil-soluble, sulphur and halogen-containing olefin polymer is prepared by reacting an alpha olefin having up to 20 carbon atoms, preferably a methyl-substituted butene, pentene or hexene, e.g. 4-methylpentene-1, with a sulphur halide or oxyhalide, preferably chloride or bromide, in the presence of a Friedel Crafts catalyst and at a temperature within the range 50° to −120° C., preferably 5° to −60° C., the molar ratio of olefin to sulphur halide or oxyhalide being 100:0.1–25, especially 100:2–15, and the molar amount of catalyst being greater than the molar amount of sulphur halide or oxyhalide.

Suitable Friedel-Crafts catalysts include aluminum chloride, zinc chloride, antimony chloride, ferric chloride, stannic chloride, boron trifluoride, titanium tetrachloride, hydrogen fluoride and mixtures thereof. Aluminum chloride is preferred.

Suitable sulphur halides and oxyhalides include sulphur chloride ($S_2Cl_2$), sulphur dichloride ($SCl_2$), thionyl chloride ($SOCl_2$), sulphuryl chloride ($SO_2Cl_2$), the corresponding bromides and fluorides and mixtures thereof.

The reaction is preferably carried out in an inert solvent such as a chlorinated hydrocarbon, e.g. methylene chloride, ethyl chloride, ethyl bromide or carbon tetrachloride.

The invention also includes sulphur- and halogen-containing olefin polymers prepared by the method described above.

The invention further includes lubricating compositions consisting essentially of a major proportion of a lubricating base oil (which may be mineral or synthetic) and a minor proportion, e.g. 0.1 to 25%, especially 1–10%, by weight of the composition, of a sulphur- and halogen-containing olefin polymer as specified above.

A number of actual preparations of polymers according to the invention will now be described by way of example.

*Polymer A*

This polymer was formed by reacting sulphur chloride and aluminum chloride with 4-methylpentene-1 at low temperatures, e.g. −55° C., and using ethyl bromide as a solvent. Experimental details were as follows:

$S_2Cl_2$ was purified by distilling it over 2% sulphur and 1% animal charcoal, the fraction boiling in the range 30°–31° C. under water pump vacuum being used for the experiment. The ethyl bromide and 4-methylpentene-1 were dried over a molecular sieve and pure, dry $AlCl_3$ was used.

6.68 g. (0.05 M) $AlCl_3$ was added to a 500 ml. 3-necked flask together with 200 ml. dried EtBr in a dry atmosphere in a glove-box; the mixture was shaken until all the $AlCl_3$ had dissolved. 3.38 g. (0.025 M) redistilled $S_2Cl_2$ was added to the flask. 42.6 g. (0.5 M) 4-methylpentene-1 was placed in a sealed dropping funnel. The 500 ml. flask was attached with this dropping funnel, a nitrogen bleed, a stirrer, a water condenser and a thermometer and placed in a bath of acetone/solid carbon dioxide at −60° C.

Dry nitrogen was passed through the flask and the 4-methylpentene-1 added slowly to the mixture over a period of 40 minutes, keeping the flask temperature between −50° and −55° C.

There were no obvious signs of polymerisation at this stage although the colour of the solution had changed to a light green. After passing dry nitrogen through for a further one hour to complete the reaction, 100 ml. n-heptane was added as a higher boiling hydrocarbon solvent followed by 100 ml. distilled water to render the $AlCl_3$ catalyst unreactive. On addition of the water, the temperature of the mixture increased rapidly to −10° C. and a thick layer of white polymer was evident on top of a yellow-coloured solution.

The polymer solution was heated up to the boiling point of the ethyl bromide and this solvent was stripped off. The yellow solution was washed four to five times with equal portions of distilled water to remove unreacted material and any acids formed during the reaction. The solution plus water was finally stirred at 80° C. for 1 hour and the water separated off. The polymer solution was dried over anhydrous magnesium sulphate and filtered to give a clear deep yellow solution. The n-heptane was stripped off by heating up to 150° C. first using a water pump vacuum and finally using an oil pump to a pressure of 1 mm. Hg. 37 g. of a dark-brown sticky polymer (Polymer A) was obtained which contained 2.8% sulphur and 3.3% chlorine.

The viscosity index-improving and load carrying (EP) properties of the polymer were tested in two refined lubricating oils (P and Q) obtained from Middle East crude oils. The results are given in the table below.

*Polymer B*

13.34 g. (0.10 M) $AlCl_3$ together with 5.19 g. (0.5 M) sulphur dichloride ($SCl_2$) were added to 150 ml. dried ethyl bromide in a 500 ml. three-necked flask placed inside a dry glove box. As with sulphur monochloride, a red coloured solution was formed. 42.6 g. (0.5 M) 4-methylpentene-1 was added over 30 minutes under $N_2$ keeping the reaction temperature at −55°±2° C. by means of an acetone-cardice (solid carbon dioxide) bath. The polymer was worked up in a similar manner to the sulphur monochloride polymer and 30 g. of a dark brown polymer were obtained. It had a sulphur content of 1.48% wt. and a chlorine content of 2.05% wt. Test data on this polymer are given in the table.

*Polymer C*

10.02 g. (0.075 M) $AlCl_3$ together with 6.76 g. (0.05 M) sulphuryl chloride ($SO_2Cl_2$) were added to 150 ml. dried ethyl bromide in a 500 ml. three-necked flask and once again a red solution was obtained. 42.6 g. (0.5 M) 4-methylpentene-1 were added slowly to this solution under $N_2$ at −55°±2° C. and after working up, 23 g. of a dark brown low molecular weight polymer was obtained having a sulphur content of 1.15% wt. and a chlorine content of 3.70% wt. Test data on this polymer are given in the table.

Polymer D 20.04 g. (0.15 M) AlCl₃ and 11.92 g. (0.10 M) thionyl chloride SOCl₂ were added to 300 ml. ethyl bromide to form a yellow solution. 85.2 g. (1 M) 4-methylpentene-1 was added over 45 minutes keeping the reaction temperature at $-55°\pm2°$ C. and after working up in a similar manner to previous examples except that more rigorous washing of the polymer took place, 60 g. of a light brown polymer were obtained having a sulphur content of 0.68% wt. and a chlorine content of 1.05% wt. Test data on this polymer are given in the table below.

TABLE

| | Kinematic Viscosity (centistokes) | | | VI | Shell Four Ball Test Results | | | | Copper Corrosion Test | Hydrolytic Stability Test | | | |
| --- | --- | --- | --- | --- | --- | --- | --- | --- | --- | --- | --- | --- | --- |
| | | | | | | | | | | Oil Layer | | Water Layer | |
| | 100° F. (38° C.) | 140° F. (60° C.) | 210° F. (99° C.) | | MHL, kg. | 2½ SDL, kg. | ISL, kg. | WL, kg. | | TAN | SAN | TAN | SAN |
| Base Oil P | 45.64 | 18.84 | 6.53 | 103 | | | | | | | | | |
| Base oil P plus 2% wt. Polymer A | 59.67 | 24.23 | 8.19 | 114 | | | | | | | | | |
| Base oil 1 plus 4% wt. Polymer A | 77.94 | 31.02 | 10.25 | 119 | | | | | | | | | |
| Base oil Q | 242.4 | | 18.25 | 90 | 26.9 | | | 150 | | | | | |
| Base oil Q plus 5% wt. Polymer A | 428.3 | | 29.62 | 103 | 48.4 | | | 300 | | | | | |
| Base oil Q plus 5% wt. Polymer B | | | 27.06 | 101 | 46.0 | 100/110 | 110 | 250 | | | | | |
| Base oil Q plus 5% wt. Polymer C | | | 22.05 | 95 | 47.4 | 115 | 80 | 350 | 1b | 0.15 | 0.10 | 0.04 | 0.03 |
| Base oil Q plus 5% wt. Polymer D | | | 28.20 | 107 | 39.5 | 100 | 100 | 220 | 1b | 0.08 | Nil | 0.02 | Nil |

Notes on the table

1. The Copper Corrosion Test used was the ASTM D 130 test.
2. The Hydrolytic Stability Test consisted of stirring a polished copper rod at 1000 r.p.m. in a mixture of 100 g. of the oil blend plus 200 g. water at 90° C. for five hours. The total acid and strong acid numbers of the oil and water layers are measured after the test.
3. Abreviations:

MHL=Mean Hertz Load
2½ SDL=2½ Second Delay Load
ISL=Initial Seizure Load
WL=Welding Load
TAN=Total Acid Number (mg. KOH/g.)
SAN=Strong Acid Number (mg. KOH/g.)
VI=Viscosity Index The results in the table show that all the polymers according to the invention acted as viscosity index improvers and as EP additives. The lubricants containing the polymers made with sulphur oxyhalides (Polymers C and D) were also tested for copper corrosion by the ASTM Copper Corrosion test and, as will be seen from the table, they passed this test. The lubricants containing Polymers C and D also passed the hydrolytic stability test.

If desired, the polymers according to the invention can be treated to remove any acidity that may be present, e.g. by percolation through an alumina column, stirring with alumina or alkali washing.

We claim:

1. A method of preparing an oil soluble, sulphur- and halogen-containing olefin polymer, which comprises: reacting a feed olefin selected from the group consisting of methyl-substituted alpha-butene, methyl-substituted alpha-pentene, and methyl-substituted alpha-hexene with a sulphur compound selected from the group consisting of sulphur chlorides, sulphur oxychlorides, sulphur bromides and sulphur oxybromides in the presence of a Friedel Crafts catalyst and at a temperature within the range of 50° to −120° C., wherein the said sulphur compound is present in an amount from 0.1–25 moles per 100 moles of said feed olefin and wherein the molar amount of said Friedel Crafts catalyst is greater than the molar amount of said sulphur compound.

2. A method according to claim 1, in which the olefin is 4-methylpentene-1.

3. A method according to claim 1, in which the sulphur compound is selected from the group consisting of sulphur chloride, sulphur dichloride, thionyl chloride and sulphuryl chloride and the corresponding bromides.

4. A method according to claim 1, which comprises carrying out the reaction at a temperature within the range 5° to −60° C.

5. A method according to claim 1, which comprises using 2–15 moles of the sulphur compound per 100 moles of the feed olefin.

6. A method according to claim 1, in which the Friedel Crafts catalyst is selected from the group consisting of aluminum chloride, zinc chloride, antimony chloride, ferric chloride, stannic chloride, boron trifluoride, titanium tetrachloride and hydrogen fluoride.

7. A sulphur- and halogen-containing polymer prepared by a method according to claim 1.

References Cited
UNITED STATES PATENTS 2,259,695 9/1941 Hull _____ 260—139
2,315,529 4/1943 Kelso _____ 260—139
2,348,080 5/1944 Lincoln et al. _____ 260—139

CHARLES B. PARKER, *Primary Examiner.*

JOSEPH P. BUEST, *Examiner.*

D. R. PHILLIPS, *Assistant Examiner.*